United States Patent Office 3,729,476
Patented Apr. 24, 1973

3,729,476
CERTAIN 3-ACETAMIDO OR 3-BENZAMIDO-6-HYDROXY-2-1-H-PYRIDONES
Peter William Austin and Allen Crabtree, Manchester, England, assignors to Imperial Chemical Industries Limited, London, England
No Drawing. Filed May 5, 1971, Ser. No. 140,586
Claims priority, application Great Britain, July 10, 1970, 33,635/70
Int. Cl. C07d 31/44
U.S. Cl. 260—295.5 A          6 Claims

ABSTRACT OF THE DISCLOSURE

4 - substituted - 2,6 - dihydroxypyridines and the corresponding N-substituted-2-hydroxypyrid-6-ones containing a 3-amino group are acylated with the halides or anhydrides of organic carboxylic or sulphonic acids to give a range of valuable coupling components; acylation is preferably carried out under an inert atmosphere or on the amino compound as it is formed by reduction of a 3-nitroso, -nitro or -arylazo derivative.

The products obtained by coupling with aromatic diazonium compounds are azo dyestuffs, e.g. disperse dyes for cellulose acetate and polyester fibre, cellulose-reactive or direct dyes for cotton and viscose, metal-complex and acid dyes for wool, and cationic dyes for polyacrylonitrile materials.

---

This invention relates to new heterocyclic compounds of the pyridone series valuable for use as coupling components for the manufacture of azo dyestuffs.

According to the invention there are provided the compounds of the general formula:

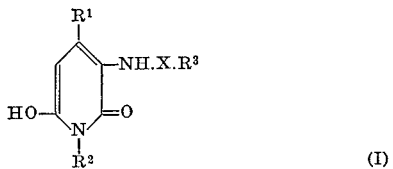

wherein $R^1$ represents an alkyl radical or a phenyl radical which may be substituted, e.g. by chlorine, lower alkyl or lower alkoxy, $R^2$ represents a hydrogen atom, an alkyl or aralkyl radical, or a phenyl radical which may be substituted, e.g. by chlorine, lower alkyl or lower alkoxy, X represents CO or $SO_2$ and $R^3$ represents a hydrocarbon or heterocyclic radical which may be substituted.

The symbol $R^3$ can have a very wide significance representing, in general, the radical $R^3$ of an organic carboxylic or sulphonic acid of formula $R^3CO_2H$ or $R^3SO_3H$. Thus $R^3$ may represent an aliphatic, carbocyclic or heterocyclic radical, e.g. alkyl, alkenyl, cycloalkyl, aralkyl, aryl or heterocyclic radicals which may be substituted.

As examples of alkyl groups represented by $R^1$, $R^2$ and $R^3$ there may be mentioned methyl, ethyl, butyl hexyl, dodecyl, n-propyl, isopropyl, and β-sulphatoethyl.

As examples of substituted phenyl radicals represented by $R^1$ and $R^2$ there may be mentioned tolyl, xylyl, anisyl, ethylphenyl, ethoxyphenyl, chlorophenyl and dichlorophenyl.

As examples of substituted alkyl radicals represented by $R^3$ there may be mentioned halogeno- or cyano-alkyl radicals e.g. chloromethyl, β-chloroethyl, β-bromoethyl, α,β-dichloro and dibromoethyl, cyanomethyl and tetrafluorocyclobutyl.

As examples of alkenyl and substituted alkenyl radicals represented by $R^3$ there may be mentioned vinyl, α-methylvinyl and prop-2-enyl, β-(tetrafluorocyclobutyl) ethenyl, β-(trifluorocyclobutenyl)ethenyl and trifluorocyclobutenyl.

As examples of cycloalkyl radicals represented by $R^3$ there may be mentioned cyclohexyl and 4-methylcyclohexyl.

As examples of aralkyl radicals represented by $R^2$ and $R^3$ there may be mentioned benzyl and phenylethyl.

As examples of aryl and substituted aryl radicals represented by $R^3$ there may be mentioned phenyl, tolyl, xylyl, anisyl, ethoxyphenyl, chlorophenyl, α- and β-naphthyl and 4-(4′,5′-dichloropyridaz-6-on-1-yl)phenyl.

As examples of heterocyclic and substituted heterocyclic radicals represented by $R^3$, there are mentioned 3- and 4-pyridyl, 2,3-dichloroquinoxalin-5-and 6-yl, 2,4-dichloroquinazolin-6- and -7-yl, 2,4,6-trichloroquinazolin-7 and -8-yl, 2,4,7- and 2,4,8-trichloroquinazolin-6-yl, 1,4-dichlorophthalazin-6-yl, 4,5-dichloropyridaz-6-on-1-yl and 2,4-dichloropyrimid-5-yl.

Because of their ease and economy of manufacture, the preferred compounds are those in which $R^1$ represents methyl, $R^3X$ represents acetyl, and $R^2$ represents a lower alkyl group. Throughout this specification, the term "lower" used to qualify "alkyl" or "alkoxy" means "having up to 4 carbon atoms."

The invention also provides a process for manufacture of the compounds of Formula 1 which comprises treating a compound of the formula:

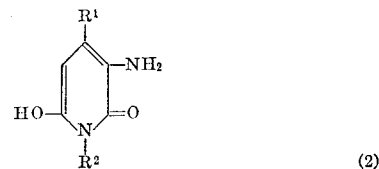

wherein $R^1$ and $R^2$ have the meanings stated above with the halide or anhydride of an acid of the formula $R^3 \cdot X \cdot OH$.

As examples of compounds of Formula 2 there may be mentioned 1-ethyl - 4 - methyl-3-amino-6-hydroxypyrid-2-one, 3-amino - 1,4 - dimethyl - 6 - hydroxypyrid-2-one, 3-amino-1-ethyl-4-phenyl-6-hydroxypyrid-2-one, 3-amino-4-methyl-2,6-dihydroxypyridine, 3-amino-4-methyl-1-propyl-6 - hydroxypyrid - 2 - one, 3-amino-4-methyl-1-phenyl-6-hydroxypyrid - 2 - one, 3-amino - 4 - methyl-1-(3-chlorophenyl)-6-hydroxypyrid-2-one, 3-amino - 4 - methyl-1-(4-chlorophenyl) - 6 - hydroxypyrid-2-one, and 3 - amino-1-benzyl-4-methyl-6-hydroxypyrid-2-one.

As examples of halides or anhydrides of acids of formula $R^3.X.OH$ there may be mentioned: alkyl and aryl sulphonyl chlorides, e.g. methane and toluene sulphonyl chlorides, alkyl and aryl carbonyl chlorides, e.g. acetyl, priopionyl and benzoyl chlorides, acid anhydrides e.g. acetic anhydride, and heterocyclic- or heterocyclic-substituted alkyl-carbonyl or sulphonyl chlorides in which the heterocyclic nucleus carries cellulose-reactive halogen atoms e.g. 2,3-dichloroquinoxaline-5- and 6-carbonyl chlorides, 2,3-dichloroquinoxaline-5- and -6-sulphonyl chlorides, 2,4-dichloroquinazoline-6- and -7-sulphonyl chlorides, 2,4,6-trichloroquinazoline-7 and -8-sulphonyl chlorides, 2,4,7- and 2,4,8-trichloroquinazoline-6-sulphonyl chlorides, 2,4-dichloroquinazoline-6-carbonyl chloride, 1,4-dichlorophthalazine-6-carbonyl chloride, 2,4-dichloropyrimidine-5-carbonyl chloride, β-(4,5-dichloropyridaz-6-on-1-yl)propionyl chloride, 1-(4′-chlorocarbonylphenyl)-4,5-dichloropyridaz-6-one, and 1-(4′-chlorosulphonylphenyl)-4,5-dichloropyridaz-6-one.

The above process may be carried out in conventional manner by treating the amine of Formula 2 with the halide or anhydride in an inert organic solvent. Since the amine is extremely susceptible to oxidation, it is advisable to carry out the reaction under an oxygen-free atmosphere or to manufacture the amine under conditions such that it is converted to the acyl compound as it is formed. Three convenient methods for manufacture of the amine of Formula 2 consist in nitrating or nitrosating a compound of the formula:

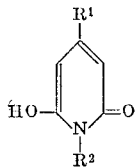

(3)

or by coupling a compound of Formula 3 with a diazonium compound, especially a diazotised sulphonated aniline, and reducing the resulting nitro, nitroso- or azo-compound.

The new compounds couple readily with the diazonium salts from a wide range of amines and in consequence are valuable dyestuff intermediates.

For example:

(a) By using a diazonium compound containing one or more sulphonic acid groups, and possibly an azo group a water-soluble dye is obtained which may be used for dyeing and printing a wide variety of material e.g. silk, wool, superpolyamides, polyhydroxylic materials of fibrous structure, e.g. regenerated cellulose e.g. viscose rayons and natural cellulose, e.g. cotton and linen. Many of the dyestuffs are suitable for dyeing nitrogen-containing materials, especially wool, from an acid bath. In this connection, one can refer, e.g. to diazotised aniline- and naphthylamine mono- or di-sulphonic acids and aminoazobenzene sulphonic acid.

(b) By using a diazonium compound containing one or more sulphonic acid groups and a cellulose-reactive group, a water-soluble dye is obtained which can be used for the dyeing and printing of cellulose, polyamide and wool textile materials with which they react in the presence of alkali and, if necessary, the action of heat. Into this category come primarily the diazotisation products of the monocondensation products of aromatic sulphonated diamines, e.g. m- and p-phenylenediamine mono- and di-sulphonic acids with polyhalogenated heterocyclic compounds e.g. tri- and tetra-chloropyrimidines or cyanuric chloride and its mono-condensation products with methanol, ammonia or sulphonated monoamines of the benzene or naphthalene series. Dyestuffs of related properties can be obtained by first forming an azo dyestuff as described under (a), hydrolysing to convert the NHXR$^3$ group to NH$_2$ and condensing with the aforesaid polyhalogenated compounds.

(c) By using a diazonium compound of an aromatic amine free from water-solubilising groups, water-insoluble dyestuffs can be obtained useful as disperse dyestuffs in the presence of dispersing agents, e.g. sulphited cellulose or synthetic surface-active agents or a combination of wetting and dispersing agents. For this purpose, a dyestuff preparation is used containing a dispersing agent and the dyestuff in a finely-divided state. These dyestuff preparations can be obtained in the usual way, e.g. by milling the dyestuff in the presence of the dispersing agent, and used for the dyeing of cellulose acetate and polyethylene terephthalate by conventional processes e.g. by dyeing at 100° C. or over in the presence of a carrier e.g. salicyclic acid, phenol, o- or p-hydroxydiphenyl, or by a thermofixation process in which the fabric is padded through a dispersion of the dyestuff and given a short treatment at a temperature of 180–210° C. or possibly higher. Suitable aromatic amines for this purpose include, e.g. anilines containing up to 3 substituents selected from NO$_2$, Cl, Br, CH$_3$, CH$_3$O, CN and alkoxycarbonyl or alkylsulphonyl groups in the o- and p-positions of the amino group, or amines containing a heterocyclic five-membered ring having 2 or 3 hetero atoms, preferably 1 nitrogen and 1 or 2 sulphur or oxygen atoms in the nucleus e.g. amino-thiazoles, indazoles, triazoles, benzthiazoles and thiadiazoles.

(d) By using a diazonium compound of an aromatic amine containing a hydroxyl or carboxyl group ortho to the amino group, dyestuffs are obtained which can be converted by the usual metallisation procedures into chromium or cobalt complexes which, when free from sulphonic and carboxylic acid groups are dispersible in water and weakly acid dyebaths and can be used for the dyeing and printing of animal fibres, e.g. silk, leather and especially wool, and some synthetic materials e.g. superpolyamides and superpolyurethanes, and polypropylene. For this purpose they may be applied from slightly acid, neutral or slightly alkaline baths, especially an acetic acid bath. Alternatively chromium, cobalt or copper complexes containing sulphonic acid groups obtained in a similar manner can be used for dyeing wool as described under (a) or hydrolysed and converted to a cellulose-reactive dye as described under (b). Suitable aromatic amines for this purpose include o-aminophenols, o-aminonaphthols and anthranilic acid and their derivatives containing SO$_3$H and, optionally Cl and/or NO$_2$ substituents.

(e) By using a diazonium compound of an aromatic amine containing a quaternised ammonium group, dyestuffs are obtained which may be used for the dyeing or printing of many synthetic fibres, e.g. polyvinyl chloride, polyamides, polyurethanes, polyethylene terephthalates, and especially polyacrylonitrile and polyvinylidene cyanide fibres. In "polyacrylonitrile" fibres are included a range of polymers containing more than 80% e.g. 80–95% of acrylonitrile, the remaining 5–20% can be e.g. vinylacetate, vinylpyridine, vinyl chloride, vinylidene chloride, acrylic acid, acrylic acid esters, methacrylic acid or methacrylic acid esters. These dyestuffs are usually slightly electrolyte sensitive and exhibit in part a decidedly good solubility in water or polarised solvents. Dyeing may be carried out in aqueous neutral or slightly acid media, preferably at the boiling point under atmospheric pressure or at a higher temperature and higher pressure. Suitable amines for this purpose include, e.g. amino-acetophenones or propiophenones in which the methyl or ethyl group carries a quaternised ammonium group. Dyestuffs of related properties can be obtained, e.g. from those obtained as described in paragraph (c) above by introducing a quaternised ammonium group after coupling, e.g. by first forming a dyestuff containing a halogenated alkyl radical and reacting with an amine or by first forming a dyestuff containing an amino group and reacting with an alkylating agent to form a quaternary ammonium group by methods well known in themselves.

The invention is illustrated by the following examples in which parts are by weight:

EXAMPLE 1

3-acetylamino-1-ethyl-6-hydroxy-4-methylpyrid-2-one 31 parts of 1-ethyl-6-hydroxy-4-methylpyrid-2-one are dissolved in a mixture of 200 parts of water, 110 parts of 2 N sodium hydroxide and 105 parts of 2 N sodium nitrite solution. The solution is cooled to 0–5° C. and added to a mixture of 500 parts of 2 N hydrochloric acid and 200 parts of ice, at such a rate that the temperature of the mixture does not rise above 10° C. The precipitate of 1-ethyl-6-hydroxy-4-methyl-3-nitrosopyrid-2-one which is formed is filtered off, washed with 3× 100 parts of water and dried. This product is suspended in a mixture of 350 parts of acetic acid and 65 parts of acetic anhydride, 18 parts of a catalyst consisting of 3% palladium on charcoal as a paste with an equal weight of water are added and the mixture is shaken in an atmosphere of hydrogen until the rapid uptake of hydrogen has ceased. The mixture is filtered and the filtrate evaporated to dryness. The residue is triturated with water and the colourless product collected by filtration, washed with 3× 100 parts of water and dried. Upon analysis it is found to contain C=57.0; H=6.6; N=13.2% M.W.+ 210

($C_{10}H_{14}O_3N_2$ requires C=57.1; H=6.7; N=13.3% M.W. 210).

EXAMPLE 2

17.3 parts of metanilic acid are dissolved in 200 parts of water by the slow addition of caustic liquor (70° Tw). The solution is acidified with 35 parts of concentrated hydrochloric acid and then diazotised at 0–5° C. by the addition of 50 parts of 2 N sodium nitrite solution. The excess nitrous acid is destroyed by adding a 0% aqueous solution of sulphamic acid.

15.3 parts of 1-ethyl-6-hydroxy-4-methylpyrid-2-one are dissolved in 200 parts of water at pH 8–9. The diazonium salt suspension is then added and, after the pH of the mixture has been adjusted to 6.7 with dilute alkali the mixture is stirred at 0–5° C. for 1 hour, the solution is then salted to 25% w./v. sodium chloride and the precipitate collected by filtration, washed with a little saturated brine, and dried in vacuo at 40° C. The dry solid is stirred at room temperature with 100 parts of acetic acid and 28 parts of acetic anhydride. 25 parts of zinc dust are added in three portions to the suspension, the temperature rising to 80° C. after the first two additions. The mixture is cooled to room temperature, diluted with 200 parts of water, and filtered. After standing the filtrate overnight the precipitate of 3-acetylamino-1-ethyl-6-hydroxy-4-methyl-pyrid-2-one is collected by filtration, washed with 3 × 20 parts of water and dried in vacuo at 40° C. The product is identical in all respects with that described in Example 1.

EXAMPLE 3

11.5 parts of 1-phenyl-3-nitroso-4-methyl-6-hydroxy pyrid-2-one are suspended in a mixture of 70 parts of acetic acid and 10 parts of acetic anhydride, together with 2 parts of a catalyst consisting of 3% palladium on charcoal as a paste with an equal weight of water. The mixture is shaken under an atmosphere of hydrogen until absorption of hydrogen is complete. The solution is screened, and the filtrate diluted with an equal volume of water. The solution is then evaporated to dryness and the solid recrystallised from acetic acid. The 3-acetylamino-1-phenyl-6-hydroxypyrid-2-one is dried at 100° C. and melts at 230–1° C. On analysis it is found to contain C=65.3; H=5.5; N=10.8%. $C_{14}H_{14}O_3N$ requires C=65.2; H=5.4; N=10.9%.

EXAMPLE 4

A mixture of 11.5 parts of 1-phenyl-3-nitroso-4-methyl-6-hydroxypyrid-2-one, 8.2 parts of sodium acetate, 7.7 parts of benzoyl chloride, 70 parts of acetic acid and 2 parts of the catalyst described in Example 1 are shaken under an atmosphere of hydrogen until uptake of hydrogen has ceased. The solution is screened and the filtrates added to 1000 parts of water. The precipitated product is filtered off and washed with water. The precipitate is dissolved in 100 parts of water by addition of 2 N sodium carbonate solution as required. The solution is screened and the filtrates acidified to pH 1.0 by addition of hydrochloric acid (36° Tw). The precipitate is filtered off, washed with water and dried under vacuum over calcium chloride.

The 1-phenyl-3-benzoylamino-4-methyl-6-hydroxypyrid-2-one melts at 192–3° C., and on analysis is found to contain N=8.6%. $C_{19}H_{16}O_3N_2$ requires N=8.7%.

EXAMPLE 5

A mixture of 4.5 parts of 1-ethyl-3-nitroso-4-methyl-6-hydroxypyrid-2-one, 2 parts of sodium hydroxide, 100 parts of water and 2 parts of the palladium catalyst described in Example 1 are shaken in an atmosphere of hydrogen for 6 hours. The atmosphere of hydrogen is replaced by nitrogen and the solution screened, taking care to exclude air. The filtrate is stirred at 20° C. under nitrogen and the pH adjusted to 9–10 by addition of solid carbon dioxide. A solution of 3.0 parts of benzoyl chloride in 12 parts of acetone is added dropwise to the solution above, keeping the pH at 9–9.5 by addition of sodium carbonate as required, and the reaction under an atmosphere of nitrogen.

The solution is then acidified with hydrochloric acid (36° Tw) to pH 2.0 and the solid filtered off and dried. The solid is boiled with 50 parts of carbon tetrachloride and ethyl acetate added until solution is nearly complete. The solution is cooled, screened, and the filtrates concentrated to a small volume. The solid is filtered off and dried at 100° C. under vacuum.

The 1-ethyl-3-benzoylamino-4-methyl-6-hydroxypyrid-2-one melts at 149° C. and on analysis is found to contain C=65.9; H=5.6; N=10.5%. $C_{15}H_{16}O_3N_2$ requires C=66.2; H=5.9; N=10.3%.

EXAMPLE 6

13.2 parts of 1-(2'-chlorophenyl)-3-nitroso-4-methyl-6-hydroxypyrid-2-one, 70 parts of acetic acid, 10 parts of acetic anhydride and two parts of the palladium catalyst described in Example 1 are shaken under an atmosphere of hydrogen until uptake is complete. The solution is screened and the filtrate diluted with 100 parts of water. The solid is filtered off, redissolved in acetic acid and precipitated by addition of water. The solid is filtered off and dried at 40° C. under vacuum.

The 1-(2'-chlorophenyl)-3-acetylamino-4-methyl-6-hydroxypyrid-2-one melts at 120° C. and on analysis is found to contain C=57.1; H=5.3; N=9.0%.

$$C_{14}H_{13}O_3N_2Cl$$

requires C=57.5; H=5.3; N=9.6%.

EXAMPLE 7

A mixture of 4.5 parts of 1-ethyl-3-nitroso-4-methyl-6-hydroxypyrid-2-one in 100 parts of water, 2 parts of sodium hydroxide and 2 parts of the palladium catalyst described in Example 1 is shaken for 2 hours under an atmosphere of hydrogen. The hydrogen is replaced by nitrogen and the solution screened, taking care to exclude air. The filtrates are stirred at 20° C. under nitrogen and a solution of 10 parts of toluene p-sulphonyl chloride in 40 parts of acetone, is added dropwise, keeping the solution just alkaline to Brilliant Yellow test paper by simultaneous addition of solid sodium carbonate as required. The mixture is then acidified to pH 2.0 with hydrochloric acid and stirred at 0–5° C. for 1 hour. The solid is filtered off, boiled in acetone with decolourising charcoal, screened, and the filtrates diluted with an equal volume of water. The solid is filtered off and dried at 40° C. under vacuum. The 1 - ethyl - 3 - (4'-methylphenylsulphonylamino)-4-methyl-6-hydroxypyrid-2-one melts at 168–170° C. and on analysis is found to contain S=9.9%. $C_{15}H_{18}O_4N_2S$ requires S=9.9%.

Further examples of the invention, based on Formula 1, are disclosed in the table, and may be prepared by methods similar to those described in Examples 1–7. In the table, column II describes the substituent T, column III describes substituent $R_2$ and column IV describes the group $X-R_3$.

| Ex. | T | $R_2$ | $R_3$ |
| --- | --- | --- | --- |
| 8 | Methyl | —H | Chloroacetyl. |
| 9 | do | —$CH_2CH_2CH_3$ | β-(2,2,3,3-tetrafluorocyclobutyl)-acryloyl. |
| 10 | do | Benzyl | β-(2,3,3-trifluorocyclobut-1-enyl)-acryloyl. |
| 11 | do | Cyclohexyl | Acryloyl. |
| 12 | do | —$CH_2CH_3$ | β-(2,2,3,3-tetrafluoro)cyclobutyl-carbonyl. |
| 13 | Phenyl | —$CH_3$ | β-(4,5-dichloropyridaz-6-on-1-yl)-propionyl. |
| 14 | do | Phenyl | Sulphatoethylsulphonyl. |
| 15 | Methyl | —$CH_2CH_3$ | 3,6-dichloropyridaz-4-ylcarbonyl. |
| 16 | do | —$CH_2CH_3$ | 2,4-dichloropyrimid-5-ylcarbonyl. |
| 17 | do | —$CH_2CH_3$ | Methylsulphonyl. |
| 18 | do | 4'-methylphenyl | Do. |

EXAMPLE 19

10 parts of 1-ethyl-3-nitro-4-methyl-6-hydroxypyrid-2-one, 70 parts of acetic acid and 10 parts of acetic anhydride are shaken under an atmosphere of hydrogen together with 2 parts of a catalyst containing 3% palladium on charcoal as a paste with an equal volume of water. After 16 hours the solution is screened, and the filtrates evaporated nearly to dryness. The residue is mixed with 50 parts of water, the solid is filtered off and dried at 40° C. The solid is then crystallised from ethyl alcohol.

The product has an identical infra red red spectrum with an authentic sample of 1-ethyl-3-acetylamino-4-methyl-6-hydroxypyrid-2-one prepared in Example 1.

We claim:

1. A compound of the formula:

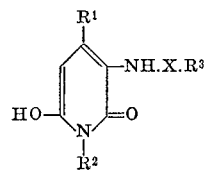

(I)

wherein $R^1$ is methyl, $R^2$ is phenyl, chlorophenyl or alkyl having from 1 to 4 carbon atoms; $R^3$ is methyl or phenyl and X is CO.

2. A compound having the formula:

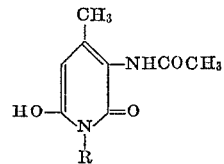

wherein R is phenyl or an alkyl group having up to 4 carbon atoms.

3. A compound as claimed in claim 2 wherein R is ethyl.

4. A compound as claimed in claim 1 wherein $R^2$ and $R^3$ are phenyl.

5. A compound as claimed in claim 1 wherein $R^2$ is ethyl and $R^3$ is phenyl.

6. A compound as claimed in claim 1 wherein $R^3$ is methyl and $R^2$ is o-chlorophenyl.

References Cited

UNITED STATES PATENTS

| | | | |
|---|---|---|---|
| 3,657,214 | 4/1972 | Berrie et al. | 260—156 |
| 3,664,996 | 5/1972 | Berrie et al. | 260—156 |

ALAN L. ROTMAN, Primary Examiner

U.S. Cl. X.R.

260—154, 156, 250 R, 250 A, 256.4 Q, 256.4 R, 294.8 F, 294.8 G, 256.5 R; 8—1 B, 1 D, 1 E, 41 A, 41 B, 41 C, 41 D, 42 B, 42 D, 42 R